No. 778,140. PATENTED DEC. 20, 1904.
C. PAFF.
STEM HOLDING AND CUTTING SHEARS.
APPLICATION FILED JUNE 8, 1904.
NO MODEL.
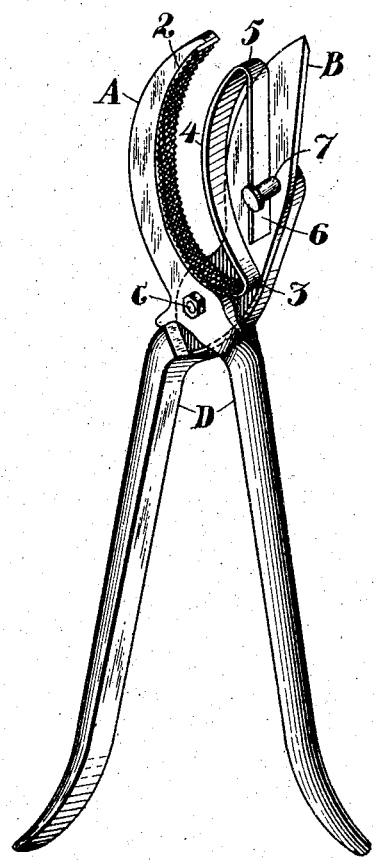
Witnesses:-
F. C. Fliedner
J. H. Towse
Inventor,
Charles Paff
By Geo H Strong
atty No. 778,140.　　　　　　　　　　　　　　　　　　　　　　　　Patented December 20, 1904.

UNITED STATES PATENT OFFICE.

CHARLES PAFF, OF SAN FRANCISCO, CALIFORNIA.

STEM HOLDING AND CUTTING SHEARS.

SPECIFICATION forming part of Letters Patent No. 778,140, dated December 20, 1904.

Application filed June 8, 1904. Serial No. 211,702.

*To all whom it may concern:*

Be it known that I, CHARLES PAFF, a citizen of United States, residing in the city and county of San Francisco and State of California, have invented new and useful Improvements in Stem Holding and Cutting Shears, of which the following is a specification.

My invention relates to a device which is especially designed for cutting the stems of flowers, grapes, or any plant and a means for holding said stems after they have been severed.

It consists in the combination and arrangement of parts and in details of construction which will be more fully explained by reference to the accompanying drawing, in which the figure is a perspective view of my device.

As shown in the drawing, A is a jaw, and B a cutting-blade, opposed thereto, the two being turnable about a pivot, as at C. These parts have handles D, by which they are manipulated, and these handles may be made of any suitable shape and size common to this class of devices. The jaw A is here shown as being concaved on the part which faces the blade B, and this blade has its cutting edge of convex shape. Upon the jaw A is fixed a plate 2, extending from the outer to the inner end of the jaw. This plate has a vertical depth considerably greater than that of the jaw, as shown in the drawing, and at the inner end near the pivot-pin C it is curved upon itself, as shown at 3. Thence it returns in a concavo-convex form, as at 4, corresponding substantially in its curvature with the curvature of the part 2. At the outer end it is again bent upon itself, as shown at 5, and finally returned over the back portion of the blade B, as shown at 6, the end approaching closely to the curvature at 3.

7 is a post fixed in the outer part of the blade B and exterior to the part 6 of the curved plate heretofore described. The portion of this plate forming the curvatures 3 4 5 and the essentially straight portion 6 are preferably made elastic, and the part 6 is slidable against the post 7.

The operation of the device will then be as follows: If a stem of any kind is to be cut, it will be inserted between the cutting members A B, and the stem will extend between the two curved plates 2 and 4, which are sufficiently separated to admit any stem that can be taken between the cutting members. The handles being closed together, the blade B will act in conjunction with the jaw A and sever the stem, and at the same time the peculiar shape and curvature of the parts 2 4 and the pressure of the pin 7 against the part 6 cause the parts 2 4 to close toward each other and grip the stem, which has already been severed, thus preventing it from falling.

The elasticity of the curved portion of the plate 3 4 5 6 is such that no other spring is necessary, and the tension of this spring is sufficient to separate the cutting members and the handles as soon as pressure upon them is relieved. Thus a single spring-plate here described serves all purposes of a holder, conforming in shape to the general form of the cutting members, and serving at the same time to separate the cutting members and handles as before described.

In order to hold the stem against the cutting-blade and prevent its slipping, I may roughen or corrugate one of the gripping-surfaces, and this is preferably the fixed surface 2.

Having thus described my invention, what I claim, and desire to secure by Letters Patent, is—

1. A stem holding and cutting device consisting of cutting members pivoted together having operating-handles extending upon the opposite side of the pivot and a curved elastic plate fixed to one cutting member and returned upon itself, extending freely over the other member and having its free end slidable longitudinally thereof.

2. A stem holding and cutting device comprising handles pivoted together having a jaw and cutting-blade, a curved plate fixed upon the interior of the jaw, said plate being extended and the inner end curved upon itself and conforming approximately to the curvature of the cutting-blade, thence returned again upon itself above said blade, and a post or projection extending laterally from the side of the blade above the pivot-point of the handles and against which post said last return portion presses to separate the jaw and blade.

3. In a stem cutting and holding device, pivoted cutting members with operating-handles, a continuous plate bent upon itself and conforming approximately to the edges of the cutting members, said plate being fixed to the inner curved face of one cutting member and independent of the other, and a post or stop on said second cutting member against which the free end of the spring presses, said free end having, also, a longitudinal sliding movement relative to the post.

4. In a stem cutting and holding device, fulcrumed handles and cutting members, a plate fixed to the inner line of one of said members and having a corrugated surface, said plate having an elastic extension substantially following the edge of the other cutting member and returning upon itself above the surface of said member, and a part against which the elastic portion acts to normally open the cutter.

In testimony whereof I have hereunto set my hand in presence of two subscribing witnesses.

CHARLES PAFF.

Witnesses:
N. E. W. SMITH,
O. A. EGGERS.